March 19, 1968   C. R. HURTIG   3,374,448

HIGH EFFICIENCY CONTIGUOUS COMB FILTER

Filed May 25, 1964

*INVENTOR.*
CARL R. HURTIG
BY *Kenway Jenney & Hildreth*

ATTORNEYS

3,374,448
HIGH EFFICIENCY CONTIGUOUS COMB FILTER

Carl R. Hurtig, Greenbush, Mass., assignor to Damon Engineering, Inc., Needham Heights, Mass., a corporation of Delaware
Filed May 25, 1964, Ser. No. 369,772
8 Claims. (Cl. 333—72)

ABSTRACT OF THE DISCLOSURE

A comb filter employing a number of individual filters connected in parallel, the pass band of each of the filters being for contiguous portions of the frequency spectrum. The filters are singly terminated and are connected directly to the voltage source.

---

My invention relates to an improved "comb filter" set for electrical signals. More particularly it relates to a comb filter set in which filters for contiguous portions of the frequency spectrum are connected in parallel and fed from the same voltage source and which yet maintains a high efficiency of power transfer from source to load.

Sets of electrical filters which form a "comb" are known in the art for many purposes. One well known application is in the processing of radar signals to determine target velocity by measuring the frequency of the returned radar signals. With a moving target, the received radar signal will be shifted in frequency from the transmitted signal by an amount dependent on the radial velocity of the target with respect to the source. This Doppler frequency shift in the received signal is measured by applying the received signal in parallel to a bank of narrow band filters chosen so that the individual filter bandwidths together cover the entire Doppler spectrum of interest. The bandwidth of individual filters is a matter of design choice depending upon considerations of desired sensitivity, velocity resolution and economy. Suitable circuitry of various types is employed following the filter bank to yield the desired information (which in the case described above would be velocity) from the filter responses to the applied signal. A system of this general type is described in an article by A. A. Galvin entitled, "A Sequential Detection System for the Processing of Radar Returns," Proceedings of the I.R.E., vol. 49, pp. 1417–1423, (September 1961).

In some applications where a large number of individual filters is used in the comb set, the signal power required to supply the set of comb filters has heretofore been substantial because the set of filters has a very low efficiency. This problem has been especially troublesome in airborne applications where the size of the filter driver and the availability of power is limited.

The problem of low efficiency may be further illustrated by the following discussion. In early comb filter sets a plurality of filters, each with its own input resistor, were connected in parallel to a voltage source. (As used herein, the term "voltage source" will be used to designate a source of electrical signals having a low source impedance.) The input resistors were included because the filter design so required. However, during a time when the source was supplying signals of a given frequency to a particular filter, the input resistors of the other filters in the set were also dissipating power. This came about because, in the stop-band region in which the other filters were operating, their input reactance was finite and therefore current was being drawn from the source through the input resistors and power was therefore being dissipated. Using this technique of connection, the theoretical efficiency of power transfer is $50/n\%$ where $n$ is the number of filters in the set. Thus for a set of 50 filters, which is not an uncommon number, the efficiency of power transfer would be theoretically limited to 1% and in practice would be considerably less because of filter insertion loss.

As used herein, the term efficiency is defined in the following manner. Assume that the signal source is a uniformly distributed spectrum i.e. white noise. Then for a set of filters, the efficiency is given by $$e \sum_{n=1}^{n} \frac{P_{on}}{P_s} \times 100\%$$

where $P_{on}$ is the power delivered to the $n^{th}$ filter in the set and $P_s$ is the power taken from the source. The actual efficiency from input to output will be less than this theoretical efficiency because of power insertion loss in the filters.

To overcome this low efficiency resulting from the dissipation of power in the input resistors to the filter sets, the filters were sometimes connected in groups or subsets. The input terminals of the sub-sets were connected in parallel to the source through a common input resistance. Thus a set of fifty filters might be connected in five sub-sets of ten filters each. Each of the sub-sets would be connected to the source through a single resistor. Thus, the number of resistors connecting filters to the source would be reduced from 50 to 10 in the case described. In order to connect individual filters in common in the manner described however, the filters in any one sub-set had to be non-contiguous; i.e. the first and second filter in the set could not be connected through the same resistor to the source. Otherwise the attenuation characteristics of the filters would be affected by interaction. In practice it was found that the filters in the sub-sets should be separated by at least four and preferably more bandwidths.

In the illustration given above the filters would be separated by five bandwidths. Thus, the first, sixth, eleventh, sixteenth, etc., filters would be in the first sub-set, the second seventh, twelfth, seventeenth, etc., filters would be in the second sub-set etc., the final sub-set containing the fifth, tenth, fifteenth, twentieth, etc., filters of the fifty filter set. It can be shown theoretically that if there are $m$ sub-sets, the efficiency of such a non-contiguous comb filter, efficiency being described as set forth above, is $$e = \frac{50\%}{m}$$

Thus, in the example being discussed the theoretical efficiency of the 50 filter set has been increased by this non-contiguous connection from 1% to 10%. However, for many applications this efficiency of power transfer is still insufficient.

I have found that by designing the filters of the comb set as singly terminated filters to be driven from a voltage source, and by applying certain constraints to the input impedance of the filters forming the comb set as a function of frequency, I can provide a comb-filter in which all the individual filters forming the set may then be connected in parallel directly to a voltage source without the interposition of resistors. Thus, the individual filters in the set forming my comb filter are connected contiguously. Further, a comb-filter made according to my invention has a theoretical power efficiency of 100%, neglecting insertion loss. Thus, my invention is the provision of a high efficiency contiguous comb filter for electrical signals.

Accordingly, it is a principal object of my invention to provide an impoved comb filter. Another object of my invention is to provide a comb filter of high theoretical and practical efficiency in which the filters may be contiguously connected. A further object of my invention is to provide a comb filter of the type described which may be physically realized using crystal filters as the resonant elements thereof. Other and further objects of my invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of my invention, reference should be had to the following detailed description taken in connection with the accompanying drawing, in which.

The individual filters utilized in the comb filter sets heretofore made were in general of the so-called "doubly-terminated" type. In the synthesis of filters of this type, which is described in detail in Chapter 15 of "Modern Network Synthesis" by Van Valkenburg (John Wiley & Sons, Inc., 1960) it is assumed that there is a series input resistor provided between the voltage source and the filter and that the filter output terminals are connected to a second resistor, the load resistance. Of necessity, considerable power is therefore dissipated in the input resistor of each filter. Even under the conditions of maximum efficiency one half of the available input power is dissipated in the input resistance and so, assuming an ideal voltage source (0 source impedance) and a lossless filter, the maximum efficiency of power transfer from source to load is 50%. Where there is a mismatch of impedance so that the filter input impedance is not equal to the series resistance, then the efficiency is further diminished.

I have found that it is possible to design physically realizable filters of the so-called "singly-terminated" or "resistively terminated" types such as are described in Chapter 14 of the Van Valkenburg reference described above for use in comb filter sets. Filters of this class are synthesized on the assumption that there is no input resistor present and that a voltage source is connected directly to the filter input terminals. The filter output terminals are connected directly to the load resistor. Then, assuming an ideal voltage source and a lossless filter, all of the power taken from the source must appear in the load resistance, thus suggesting a theoretical efficiency of 100%. Of course, in practice, voltage sources are not ideal and filters are not lossless. However, even with these practical considerations taken into account, efficiencies greater than 80% have been realized for comb filter sets made according to my invention using 250 individual filters. As will be discussed more fully below, it is not sufficient that filters for use in the comb filter sets of my invention be of the singly-terminated type, another requirement being that the real part of the input impedance be substantially greater than the source impedance at mid-band, and that the individual filters be lossless as a practical matter. Further, it is usually desirable that the input impedance of the filter be symmetrical about the mid-band frequency of the filter. I have found that a singly-terminated filter having these characteristics may be synthesized using crystal resonators in a lattice configuration and comb filter sets using these lattice crystal filters are a preferred embodiment of my invention. While this embodiment will be described below, it is to be understood that singly-terminated filters using inductance-capacitance elements and having the characteristics set forth above may also be used in the improved comb filters of my invention.

Figure 1:
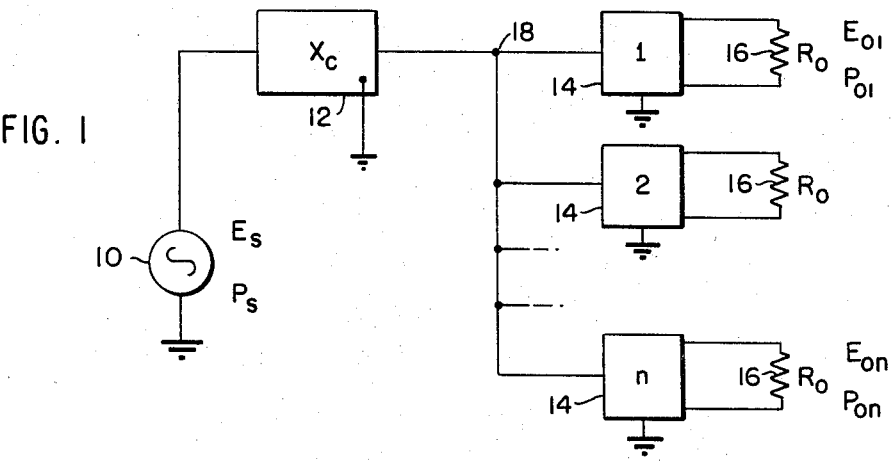
FIGURE 1 is a block and line diagram of a contiguous comb filter made according to my invention.

FIGURE 1 illustrates a comb filter set made according to my invention. A voltage source 10 characterized by an output voltage amplitude $E_s$ is connected through a substantially lossless corrective network 12. The network 12 supplies a reactive correction which will be discussed hereinafter. A large number of individual filters 14 which are substantially identical in configuration are provided. The filters 14 are numbered 1, 2 ... $n$ to indicate their position in the set of filters forming the comb. In actual use the output signals of the filters 14 would be supplied to suitable detection, integration and logic circuits. However, since the actual apparatus used following the individual filters is not a part of the present invention, each of the filters 14 are shown as terminated in a fixed resistance 16 of value $R_0$. It will be observed that each of the filters has its input terminal connected to the common junction 18 which is in turn directly connected to the reactive network 12. It will also be observed that no resistances are included between the voltage source 10 and the individual filter input terminals.

As explained above, in accordance with conventional comb filter construction, the parameters of each of the filters 14 are selected so that each filter has a pass-band which covers a portion of the frequency spectrum of interest, and the pass-bands of contiguous filters in the set overlap slightly to provide a continuous response over the entire spectrum. Thus, the individual values of the circuit elements forming each individual filter will be slightly different, even though their general configuration will be the same.

As noted, it is desirable that the input impedance of each of the individual filters 14 be "symmetrical" about its mid-band frequency $f_0$. As used herein the input impedance is considered to be symmetrical if the imaginary part of the input impedance, plotted as a function of frequency above the mid-band frequency of the filter is the mirror image of the imaginary part of the input impedance below the mid-band frequency, except for a reversal in sign. To state it another way, there must be a mirror image relationship between the imaginary part of the input impedance plotted as a function of frequency in either the 1st and 3rd or 2nd and 4th quadrants, the quadrants being defined by the zero axis of the impedance plot and a line perpendicular thereto at the mid-band frequency of the filter. If this condition is satisfied, then the reactive components of filters forming the set whose pass-bands are below the signal frequency being transmitted at a given time will tend to cancel the reactive components of filters whose pass-bands are above the signal frequency. This will in turn minimize reactive loading on the source 10 and it is for this reason that it is desirable that the input impedance be symmetrical. Of course, if source loading by the reactive currents which would be drawn if this condition were not met is not important, then this condition would not be a necessary condition. However, in practice if the impedance is not symmetrical the voltage source would have to be capable of supplying very large currents. Accordingly, one of the principal advantages of the invention, which is to permit the driving amplifier of the source to be relatively small in comparison with the drivers required for prior comb filters, would be lost. If the imaginary part of the input impedance is symmetrical as set forth above, then the real part of the input impedance, which is positive, will also have the mirror image symmetry described above, but without any change in sign.

As described above, in the design of the individual filters forming the set, it is assumed that the signal source 10 is an ideal voltage source. In practice, of course, the source 10 has a finite internal resistance. I have found that the design assumption of an ideal voltage source is adequately realized in practice if the magnitude of the real part of the input impedance at the mid-band frequency of the filter is greater than the actual source impedance by a factor of 10 or more.

Finally, to achieve desirable efficiency of operation, the filters 14 of FIGURE 1 should be substantially lossless as a practical matter. This means that the filters should be comprised of reactive elements such as inductors and capacitors, crystals or the like which have a high Q.

Figure 2:
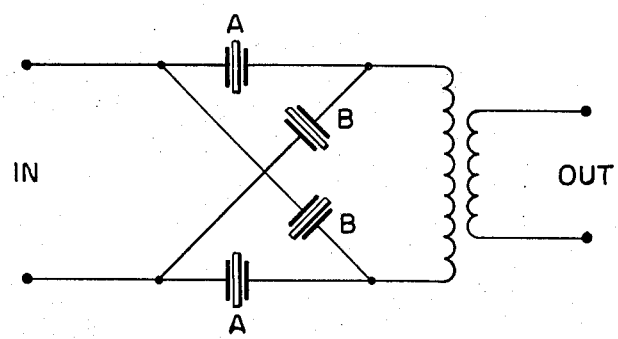
FIGURE 2 is a schematic diagram of one form of crystal filter which may be used in the contiguous comb filter of FIGURE 1.
Figure 3:
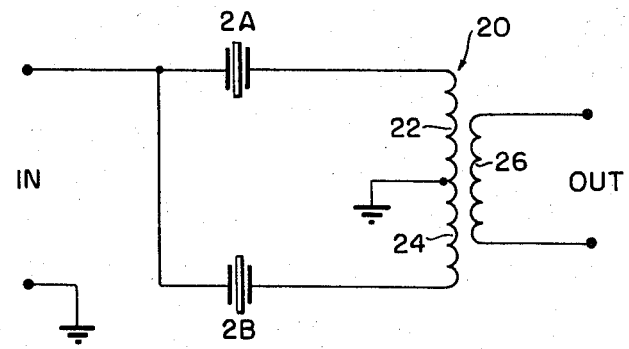
FIGURE 3 is another form of the filter shown in FIGURE 2 of more economical construction.

In FIGURE 2 I have illustrated a symmetrical lattice section of crystal filter and in FIGURE 3 the "hybrid" equivalent of the circuit of FIGURE 2. These configurations are known and have heretofore been described. (See for example, the article by Kosowsky entitled "High-Frequency Crystal Filter Design Techniques and Applications" appearing at pages 419-429 of the "Proceedings of the I.R.E." for February 1958.)

In FIGURE 2 the lattice consists of two substantially identical crystal resonators A in the series arms of the lattice and two substantially identical resonators B in the shunt arms of the lattice. The location of the poles and zeros of the impedance plotted as a function of frequency of resonators A and B determine the shape of the attenuation curve of the filter.

The circuit of FIGURE 3 is the equivalent of FIGURE 2 when the crystals 2A and 2B have twice the impedance of crystals A and B of FIGURE 2 and further when the transformer generally indicated at 20 in FIGURE 3 has closely balanced, tightly coupled primary windings 22 and 24 and a uniformly coupled secondary winding 26. It is apparent that the lattice section shown in FIGURE 3 is more economical to manufacture than that of FIGURE 2 since it utilizes only two crystal resonators rather than four. Further it is "single-ended" i.e. does not require a balanced amplifier to supply it as does the circuit of FIGURE 2. Lattice sections of the type illustrated may be cascaded to provide a complete filter, or, a single section may be used if that provides adequate attenuation and selectivity. Additional crystal resonators may also be connected in parallel with the crystals in the lattice arms if desired.

If the filter of FIGURE 2 were designed by conventional techniques, the pass-band of the filter might be defined at its lower cutoff frequency by a zero in the impedance characteristic of the A crystals and at its upper cutoff frequency by a pole of the B crystals. A pole of the A crystals would then be within the pass-band of the filter between the lower cutoff frequency and the center frequency or even above the center frequency and a zero of the B crystal impedance characteristic would lie between the center frequency (or even lower) and the upper cutoff frequency. In older synthesis techniques the pole of the A crystal and the zero of the B crystal would be coincident at the center frequency but using modern techniques they may be displaced from the center frequency as described above.

Alternatively, conventional synthesis techniques might result in a characteristic such as that described above with the poles replaced by zeros and the zeros replaced by poles. It is noteworthy that the number of singularities of each impedance characteristic in the region of interest (from lower cutoff to upper cutoff frequency) is, in each case even for each crystal.

In contrast to the foregoing, and because of the desirability of providing a symmetrical impedance characteristic, the pole-zero arrangement of crystal filters suitable for use in the contiguous comb filter of my invention is quite different. Thus, the number of singularities in the region of interest must be uneven. Further, if the filter has an even number of poles, the impedance of the A and B crystals must be mirror images of each other about the center frequency of the filter. If the filter contains an odd number of poles, then the singularities in the region of interest must be disposed symmetrically about the center frequency.

For the simple lattice network of FIGURE 2, the A crystal and the B crystal impedance characteristic would normally exhibit a zero and a pole in the region of interest. To satisfy the requirement of the preceding paragraph either a zero or a pole must be removed from the region of interest. The poles exhibited by the crystals result from the resonance of the crystal with the static capacity associated with it. By resonating this static capacity with an inductance, I have found that the poles resulting from it can be substantially removed from the portion of the frequency spectrum of interest. Thus, in the drawings of FIGURES 2 and 3 the output transformer inductance is chosen to resonate with the static capacities of the crystals so that the poles due to this capacity do not effect the transfer characteristic of the frequency spectrum of interest. Thus, within the region of interest of the filter pass-band only the zeros of the A and B crystals are present.

The input static capacity of all the filters in the bank is placed in parallel with a parallel tuned LC circuit which is the network 12. This network resonates this input static capacity to minimize reactive current drawn from the power supply from the voltage source 10. To provide a symmetrical impedance characteristic the crystal parameters are so chosen that the zeros are symmetrically disposed about the desired center frequency. Assume, by way of example that the A crystal bero is below the crystal center frequency and the B crystal zero frequency is above it. At frequencies below the zeros the imaginary part of the crystal impedances would be capacitively reactive and above it inductively reactive. Thus at frequencies below the A crystal zero, both impedances are capacitively reactive and such frequencies represent a stopband region. Between zeros, the imaginary part of the A crystal impedance is inductively reactive and that of the B crystal is still capacitive. Above the frequency of the B crystal both are inductive and this also represents a stop-band region. Thus, the pass-band is defined as the region between the two zeros where the capacitive reactance of the A crystal and the inductive reactance of the B crystal effectively cancel. The impedance of the filter will be symmetrical, as discussed above.

The impedance of the series and shunt arms of a symmetrical lattice network conventionally represented by $Z_a$ and $Z_b$ respectively are often designated by the ratio of two polynomials, the variable in the polynomials being frequency or normalized frequency. In order for a symmetrical lattice filter to exhibit a symmetrical impedance characteristic it is required that the degree of the polynomials in numerator and denominator for each impedance be unequal. This means that the number of singularities in the impedance characteristic of the series and shunt impedances of the lattice will be unequal, as set forth above. In conventional doubly-terminated filters these polynomials forming the ratio which defines the lattice impedances are of equal degree.

Thus, I have provided a high efficiency contiguous comb filter by utilizing individual filters to form the comb set which are of the singly or resistively terminated type. These filters exhibit a real impedance at their center frequency which is substantial as compared to the source impedance and are lossless as a practical matter. Further, to secure the full advantages of the invention these filters are characterized by a symmetrical input impedance as a function of frequency.

More particularly, I have described the properties of a conventional symmetrical crystal lattice filter for use in the contiguous comb filters of my invention.

Further, while I have described my invention in terms of a contiguous comb filter, it is equally applicable to a filter set in which the pass-bands are non-contiguous, as for example a sub-set such as was described in connection with prior attempts to improve comb filter set efficiency.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A comb filter comprising, in combination: a pair of input terminals for connection to a voltage source, a plurality of singly terminated substantially lossless electrical signal filters, each of said filters having input and output terminals, means connecting the input terminals of each of said filters in parallel to said comb filter input terminals, said connecting means being non-dissipative of electrical power, and resistive elements connected to the output terminals of each of said filters, each of said filters exhibiting a pass-band region, the real part of the input impedance of each of said signal filters at the center frequency of said pass band being substantially greater than the impedance of said voltage source.

2. The combination defined in claim 1 in which the pass-band region of each filter of said plurality of filters being contiguous in frequency to the pass-band of at least one other filter of said plurality of filters.

3. The combination defined in claim 1 in which each of said filters of said plurality of filters has a symmetrical impedance characteristic as a function of frequency.

4. The combination defined in claim 1 in which each of said filters of said plurality of filters is a crystal lattice filter having a symmetrical impedance characteristic as a function of frequency.

5. A comb filter for connection to a voltage source comprising, in combination: a pair of input terminals for connection to said voltage source; a plurality of singly-terminated, substantially lossless filters of the lattice type, each of said filters having a symmetrical impedance characteristic as a function of frequency, each of said filters exhibiting a pass-band, and each of said filters having input and output terminals; means connecting the input terminals of each of said filters in parallel to said comb filter input terminals, said connecting means being non-dissipative of electrical power; and individual resistive elements connected to the output terminals of each of said filters, the real part of the input impedance of each of said signal filters at the center frequency of said pass band being substantially greater than the impedance of said voltage source.

6. The combination defined in claim 5 in which the pass-band of each of said plurality of filters is contiguous in frequency to the pass-band of at least one other filter of said plurality of filters.

7. The combination defined in claim 5 in which the elements forming the lattice in each of said filters are crystals, inductive means connected across the output terminals of each lattice section of said lattice filter to resonate the output static capacity of said crystals and a single reactive network connected in parallel with the input static capacity of all of said crystal filters.

8. A comb filter for connection to a voltage source comprising, in combination: a pair of input terminals for connection to said voltage source; a plurality of singly-terminated, substantially lossless filters of the lattice type, the elements forming the lattice in each of said filters being crystals, each of said filters having a symmetrical impedance characteristic as a function of frequency, and exhibiting a pass-band, and each of said filters having input and output terminals; means connected across the output terminals of each lattice section of said lattice filter to resonate the output static capacity of said crystals, means connecting the input terminals of each of said filters in parallel to said comb filter input terminals, said connecting means being non-dissipative of electrical power and including a single reactive network connected in parallel with the input static capacity of all of said crystal filters and individual resistive elements connected to the output terminals of each of said filters, the pass-band of each of said plurality of filters being contiguous in frequency to the pass-band of at least one other filter of said plurality of filters, the real part of the input impedance of each of said signal filters at the center frequency of said pass-band being substantially greater than the impedance of said voltage source.

References Cited

UNITED STATES PATENTS

| | | | |
|---|---|---|---|
| 2,249,415 | 7/1941 | Bode | 333—6 |
| 3,054,968 | 9/1962 | Harrison | 333—72 |

ROY LAKE, *Primary Examiner.*

DARWIN R. HOSTETTER, *Assistant Examiner.*